Feb. 9, 1960   A. B. WOWRA   2,924,013
GUARD FOR DENTAL DRILLS AND BLANK THEREFOR
Filed Jan. 21, 1959

INVENTOR
Arthur B. Wowra
BY Bacon & Thomas
ATTORNEYS

United States Patent Office 2,924,013
Patented Feb. 9, 1960

2,924,013

GUARD FOR DENTAL DRILLS AND BLANK THEREFOR

Arthur B. Wowra, Barberton, Ohio

Application January 21, 1959, Serial No. 788,133

3 Claims. (Cl. 32—29)

This invention relates generally to a dental guard and more particularly to a guard adapted to protect the dental patient's tongue and cheek during drilling operations.

Serious lacerations of the tongue and mouth can occur in the drilling operation through involuntary movements of the patient, or through the inability of the dentist to control the patient's tongue and cheek with his fingers or with conventional hand instruments. This danger is even greater when high-speed dental drills are employed as these are capable of doing severe damage to the tissue in a fraction of a second.

Accordingly, it a primary object of the present invention to provide a dental guard which is mounted on the drill head and which comprises an elongated deflector surface, suitably spaced from the drill to prevent the patient's tongue from contacting the drill bit or becoming entangled therewith.

Another primary object is to provide a dental guard which is scientifically designed to prevent irritation of delicate mouth tissue or nerve endings and which will therefore not damage the same or activate the glands or muscles in the patient's mouth.

Another object is to provide a dental guard which is securely supported, solely by the drill, and which therefore gives the operator a free hand while drilling.

Another object is to provide a dental guard which is readily mounted on or removed from the drill, without the use of tools, and one which may be cleaned and sterilized.

Another important object is to provide a dental guard which serves to protect the tongue and cheek completely but one which is not itself a source of discomfort.

Another object is to provide a dental guard which is rigid enough to withstand without bending the strong forces which may be exerted by the patient.

A further object is to provide a dental guard which is simple in construction, economical to manufacture, and durable in use.

Other objects and advantages will be apparent from the following description when taken in conjunction with the accompanying drawings in which.

Figure 1:
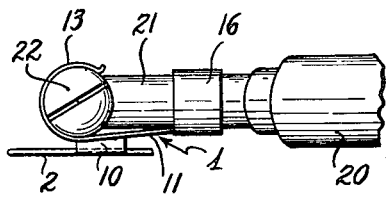
Fig. 1 is a top plan view illustrating a dental guard embodying the present invention installed on a conventional drill.
Figure 2:
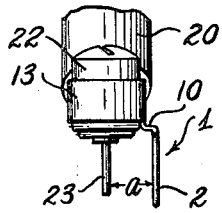
Fig. 2 is a front elevational view of the device shown in Fig. 1.
Figure 3:
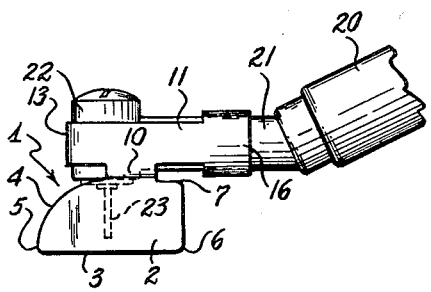
Fig. 3 is a side elevational view of the device shown in Fig. 1.
Figure 4:
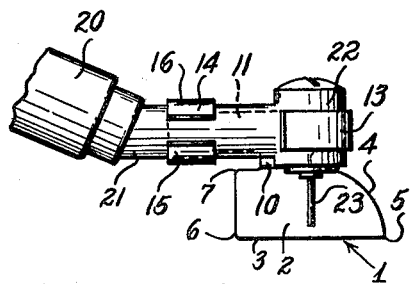
Fig. 4 is an elevational view taken from the other side of the device.
Figure 5:
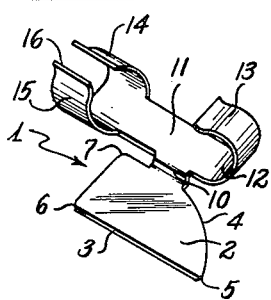
Fig. 5 is a perspective view of the dental guard shown in Figs. 1–4, in detached condition.

Referring now more specifically to the drawings, the dental guard is indicated generally by the numeral 1 and may be formed of rigid sheet material such as stainless steel or the like. The guard 1 comprises an elongated, vertically disposed flat guard plate 2 having a straight bottom edge 3 which converges with a tapered upper edge 4 at a rounded front corner 5. The remaining corners, 6 and 7, at the rear of the plate are also rounded to prevent injury to the inside of the patient's mouth.

It is of great importance to the successful operation of the invention that the guard plate 1 be shaped in the manner described. Due to the flatness of the guard plate the device can make contact with a large area of the tongue and therefore does not irritate the delicate hypoglossal nerve endings. Thus the longitudinal muscles running anteroposteriorally along the side of the tongue are not activated and no reflex movement of the tongue is caused by the contact. Similarly, the elongated straight bottom edge 3 of the plate 2 serves to distribute the pressure of contact over a large area of the floor of the mouth and therefore does not "cut" into the tissue upon movement of the tongue or irritate the sub-lingual branch of the lingual nerve which in turn would activate the sublingual gland to produce an excess secretion of saliva. The same effect is achieved when contact is made with the muco-buccal fold of the upper arch, since the straight bottom edge 3 prevents sharp contact therewith. Similarly, the elongated straight flat shape of the guard plate prevents catching the tissue covering the parotid gland in the cheek which would also produce an excess flow of saliva. Finally, when the operator is working on the lower arch, the straight bottom edge of the guard plate makes firm contact with the floor of the mouth and acts as a dam to keep the saliva clear of the field of operation.

The plate 2 is supported at its upper end by an integral inturned strip 10 which is in turn supported at the bottom of an integral vertically disposed mounting strip 11. Strip 11 includes a forward portion 12 which is curved rearwardly to define a generally circular clip 13. At the back of the strip 11 two flanges, 14 and 15, extend from the upper and lower edges thereof, respectively. These flanges curve rearwardly to define a second generally circular clip 16. The extremities of portion 12 and flanges 14 and 15 may be turned outwardly to present a curved surface which facilitates attachment of the device.

As shown in Figs. 1–4, the dental guard is mounted on one side of a drill 20. The clip 16 is readily secured about the shank 21 of drill 20 with the strip 11 passing along one side face of the drill head 22 and the clip 13 secured around the front thereof. When thus mounted, the guard 1 is not subject to accidental displacement but may be readily removed when desired by the operator.

When the guard is mounted on the drill 20 it will be noted that the guard plate 2 is offset a sufficient amount to leave a space *a* between the guard plate 2 and the drill bit 23 which will permit operation on teeth of any size. The plate 29 extends downwardly below the level of the drill bit and extends at least one and one-half centimeters forwardly therefrom and one and one-half centimeters rearwardly to preclude any possibility of the tongue or cheek entering the area between the bit 23 and the plate 2. The plate 2, however, should not be much longer than this or it will impede the operator's manipulation of the drill.

Figure 6:
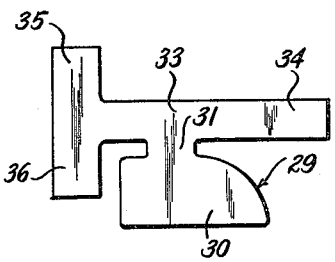
Fig. 6 is a top plan view of a blank for forming the dental guard.

In Fig. 6 a blank 29 is disclosed comprising an integral sheet of suitable rigid material including a main portion 30 shaped to serve as the guard plate 2 previously described. A short connecting portion 31 connects the main portion 30 to a strip 33 having a forward portion 34 and having flanges 35 and 36 extending from the rear portion thereof. The guard 1 may be readily formed from blank 29 by bending connecting portion 31 at substantially right angles to the main portion 30, and bending the strip 33 upwardly into a plane parallel to that of portion 30. Portion 34 and flanges 35 and 36 are then turned rearwardly and shaped to define clip members 13 and 16 respectively.

It will be readily apparent that the same blank 29 can be employed to form a complementary guard member adapted to be secured on the opposite side of the drill 20 with the guard plate offset in the opposite direction from the drill bit. Thus, the guard 1 may be detached from the drill and the complementary guard may be substituted therefor when the operator is working on the other side of the patient's mouth.

It will be understood that while one embodiment of the invention has been disclosed in detail above, various changes can be made therein without departing from the spirit of the invention or the scope of the annexed claims.

I claim:

1. A guard for use with a dental drill, comprising: an elongated, substantially flat guard plate formed of non-resilient material and terminating in a straight horizontal bottom edge; clip means adapted to be firmly secured to the head of said drill comprising a flat strip adapted to lie along one side of said drill head, said flat strip having one portion thereof extending forwardly and terminating in a rearwardly facing clip adapted to embrace the front of said drill and also having a rearwardly extending portion terminating in upper and lower clip arms adapted to embrace the shank of said drill therebetween; and a lateral connecting member formed integrally with said clip means and said guard plate for connecting the bottom of said clip means to the top of said guard plate at the rear thereof to thereby support said guard plate in depending offset relation below said clip means and projecting forwardly therefrom.

2. An integral sheet metal blank for forming a dental drill guard attachment, comprising an elongated flat body portion having a straight bottom edge terminating at its forward end in a rounded corner, a relatively short neck portion connected to the top of said elongated body portion adjacent the rear end thereof, a strap portion connected above said neck portion and extending forwardly and rearwardly therefrom in substantially parallel relation to said bottom edge, the forward end of said strap portion being adapted to be turned back upon itself to form a clip and the rearward end of said strip portion including upper and lower flange members adapted to be turned back to form opposed clip arms.

3. A guard for use with a dental drill employing a vertical bit, said guard comprising a guard plate and means for mounting said guard plate in offset depending relation with respect to said drill with said guard plate extending below the level of said bit, the bottom edge of said plate being straight and extending forwardly and rearwardly of said bit for distances approximately equal to the height of said guard plate and the upper edge of said guard plate tapering downwardly to intersect the forward end of said bottom edge.

References Cited in the file of this patent

UNITED STATES PATENTS

| | | |
|---|---|---|
| 1,285,273 | Luzzi | Nov. 19, 1918 |
| 2,307,677 | Hawkinson | Jan. 5, 1943 |